July 15, 1969  G. F. BAVOR  3,456,175
DYNAMIC BRAKING APPARATUS
Filed Aug. 31, 1966
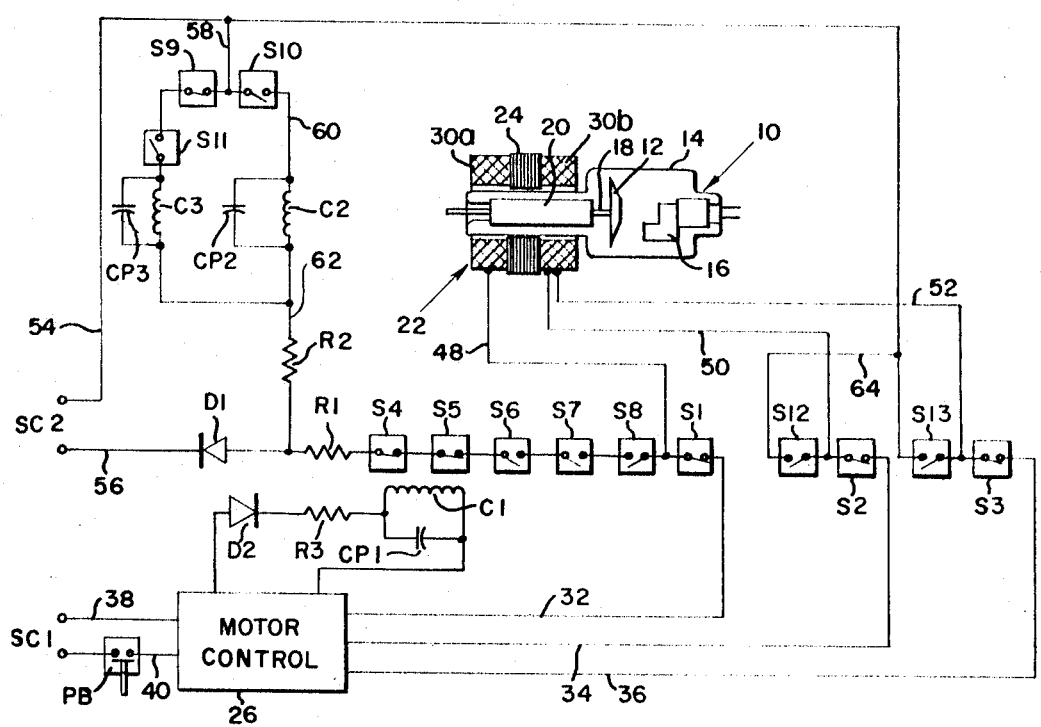
INVENTOR
GORDON F. BAVOR
BY
AGENT _United States Patent Office_

3,456,175
Patented July 15, 1969

3,456,175
DYNAMIC BRAKING APPARATUS
Gordon F. Bavor, Norwalk, Conn., assignor to The Machlett Laboratories, Incorporated, Springdale, Conn., a corporation of Connecticut
Filed Aug. 31, 1966, Ser. No. 576,443
Int. Cl. H02p *3/18*
U.S. Cl. 318—212                              7 Claims

ABSTRACT OF THE DISCLOSURE

The combination with an X-ray tube having a rotatable anode, an electric motor for driving the anode and an electrical system for energizing the motor to drive the anode at high speed and for slowing the rotation of the anode. The electrical system is so arranged that the X-ray exposures may be intentionally interrupted, braking applied, braking interrupted and subsequent exposures continued without circuit malfunctions such as contact arcing.

---

This invention pertains to dynamic braking apparatus for rapidly slowing rotation of rotatable elements and refers more particularly to a novel system for braking a motor, having especial application to braking the motor-driven rotary anode of an X-ray tube.

In the manufacture and subsequent use of devices employing rotating elements it is often important, desirable or necessary to rapidly slow the rotation of the element after its particular function has been completed. For example, in an X-ray tube employing a rotating anode, it is desirable for many reasons to brake the rotation of the anode after an exposure has been made. Such braking reduces the period of anode coasting and the duration of any resonant vibration which might occur while coasting.

Since the period of coasting may be considerably longer than the period of rotation during which an exposure is made, especially with high speed operation, braking appreciably extends the life of rotor bearings. Noise and vibration can become particularly objectionable as the rotor passes through certain resonant speeds while coasting to a stop or to a slow speed. In X-ray treatments of humans both noise and vibration can cause possible psychological effects on a patient. Also, severe resonant vibrations following high-speed rotation can result in failure of the X-ray tube by causing a rupture in the glass seal supporting the anode. While noise and vibration can be controlled to some extent in an X-ray tube by proper design of the tube and the anode-supporting structure, braking produces additional improvements. Braking not only minimizes the total duration of vibration but also minimizes the duration, and therefore the amplitude, of resonant vibration. Moreover, as bearings wear due to use and as anode targets become unbalanced due to electron bombardment, noise and vibration increase. By reducing the possibility of damage to the tube from vibration as the tube gets older, braking further extends the life of the tube, particularly when tubes are to be operated at extremely high speeds.

The circuit is so arranged that X-ray exposures may be intentionally interrupted, braking applied, braking interrupted, and subsequent exposures continued without circuit malfunctions. Thus, exposure control restrictions are not imposed.

Other advantages of a system for braking motors or motor-driven elements of devices other than X-ray tubes will become apparent to those skilled in the art. This invention is intended for application to any such system but is described herein with specific relation to an X-ray tube.

The prior art contains several examples of electrical systems for braking the rotation of the anodes of X-ray tubes. One such example comprises means for reversing the connections of one of the stator windings which thus applies a torque tending to reverse the rotor. This requires the employment of additional switching means, however, which operates after a somewhat critical predetermined interval of time to cut off the current to prevent actual reverse rotation of the rotor. Another example comprises means for disconnecting the stator windings from an alternating current source and immediately applying a direct current to one or both of the stator windings to create eddy currents in the rotor which dissipates its energy of rotation, bringing it to a stop. This generally requires rectifying equipment of considerable size to provide the direct current.

A further example of conventional braking is the rectifying circuit shown and described in U.S. Patent No. 2,242,812, Brown. This is a full-wave rectifying circuit.

The presently described braking device, when connected into the stator circuit of a rotating anode X-ray tube between the tube and a motor control device, will automatically apply 115 volts of half-wave rectified power to the stator immediately following release of the X-ray exposure button. The half-wave rectified power will cause the X-ray tube rotor to rapidly decelerate from its normal operating speed of, for example, from 3,500 to 10,800 r.p.m. to 1,000 r.p.m. or less, depending on the initial operating speed. The braking power will be automatically removed after a set time delay period and all circuits of the device will return to a standby condition.

The presently described invention is a compact and simple system which employs relatively small and efficient components whereby it can be packaged as a small item for installation in existing equipment, or for inclusion in newly manufactured equipment, without requiring modification of conventional panels, circuitry or supporting structures.

Other objects and advantages of this invention will become apparent from the following description taken in connection with the accompanying drawing wherein:

The figure depicts the invention applied to a rotating anode X-ray tube.

In the drawing the X-ray tube 10 may be of any desired structure employing a rotating anode 12 which is mounted within one end of a vacuum envelope 14. In the other end of the envelope is mounted a cathode 16 for the purpose of emitting a copious supply of electrons which impinge upon the anode for generating a beam of X-rays therefrom in the well-known manner. The electrodes of the X-ray tube 10 are connected into suitable circuitry (not shown). Any suitable system for supplying electrical power to the cathode and the anode, for causing the same to operate for the generation of X-rays, may be utilized, but since this does not form a part of the present invention, further details have been omitted.

When the tube is in operation as an X-ray generator, electron impingement upon the anode 12 results in generation of considerable heat which is dissipated by radiation from the anode and by conduction through its supporting structure outwardly of the envelope. The electrons from the cathode 16 are focused to a relatively small point on the surface of the anode 12, and thus heat tends to become concentrated at the focal spot. In order to minimize the danger of overheating, the anode is rotated at high speed. To accomplish this the anode 12 is mounted on one end of a spindle 18 which is journaled to a rotor 20. Rotor 20 is carried by the spindle internally of the vacuum envelope 14 and cooperates with an externally disposed stator 22 which encircles the envelope as part of a motor 24. When the stator is energized, the rotor, spindle and anode are caused to rotate within the envelope at high speed.

An X-ray generator of this type is usually in operation only for short intervals of time in the order of a few seconds. To control the operation of the tube, there is provided a motor control 26 of any suitable type which, after power is supplied thereto upon manual operation of push button switch PB, controls the exposure cycle of the X-ray tube when the anode has reached the desired speed of from 3,500 to 10,800 r.p.m., for example. The motor control 26 also may include means for insuring that the anode 12 is rotated at full speed during the full exposure cycle and normally includes means for disconnecting the tube energizing circuit and the anode driving motor 24 upon completion of an exposure. However, the anode 12, being of appreciable mass and supported on anti-friction bearings, will normally continue to rotate for several minutes after the anode driving motor 24 is de-energized.

The life of an X-ray tube having a rotating anode depends to some extent upon the wear in the anode support bearings, and it is known that the appreciable heat generated in the anode and transmitted to the bearings also contributes to rapid bearing wear. Therefore, since lubrication of the bearings is a problem when the bearings are enclosed within a vacuumized envelope, in order to lengthen bearing life and also, consequently, the life of an X-ray tube, it is desirable to provide means for causing the rotating anode to reach a considerably lower coasting speed after an exposure cycle. To achieve this, a braking circuit is provided as described herein, which is inserted between the X-ray tub 10 and the motor control 26 for slowing rotation of the anode to a speed not exceeding, for example, 1,000 r.p.m. This speed is slow enough to permit the anode to coast to a stand-still condition within about one minute in a conventionally constructed tube, as opposed to several minutes, without the braking system of the invention. This coasting speed not only thus reduces bearing wear but also is below the speed at which objectionable resonant vibration and noise occur. It was found unecessary to bring the anode to a complete standstill, and this permits the novel half-wave rectification circuit described herein to be employed, with its consequent reduction in the number of heretofore required heavy duty components and producing a resultant conservation of space as well as a reduction in costs.

The motor 24 is illustrated in the drawing as a single phase, capacitor type alternating current motor, but the invention is not restricted to such a motor. Such a motor comprises a pair of windings 30a and 30b which are interconnected in the usual well-known manner and connected with a capacitor (not shown) in the motor control 26 whereby it is operable when energized with single phase alternating current power from a suitable source SC1 through conductors 32–34–36 under the control of push button switch PB and motor control 26. The motor control 26 is connected directly to the source SC1 by conductors 38–40 in one of which is the push button switch PB. Operating power is delivered to the stator windings 30a–30b of the motor 24 through switches S1–S2–S3 and conductors 48–50–52, conductors 34 and 50 being common to both windings. Separate conductors 54 and 56 are connected to a second source of power SC2, conductor 56 being connected through a diode D1, resistor R1 and series of switches S4–S5–S6–S7–S8 and S1 to conductor 32. It will be noted that switches S4, S5, S1, S2 and S3 are normally closed while switches S6, S7, S8, S12 and S13 are normally open as shown.

Upon operation of push button switch PB relay coil C1 will receive power through diode D2 and resistor R3 simultaneous with starting of the motor control 26. Switches S4 and S5 are operable as relay switches by coil C1. The relay is operated on direct current with a shunt capacitor CP1 across the coil to produce relay opening time delayed action. Power on relay coil C1 opens relay switches S4 and S5 and simultaneously opens relay switch S9 and closes relay switch S10. Switch S10 is connected on one side by conductors 58 and 54 to power source SC2 and on the other side by conductor 60 to a second relay coil C2 with its time delay shunt capacitor CP2. Coil C2 is connected by conductor 62, resistor R2, diode D1 and conductor 56 to the opposite side of the power source SC2. Thus, closing of relay switch S10 by coil C1 energizes coil C2, causing it to operate. Coil C2 closes relay swithc S11 which is connected between relay switch S9 and one side of a third relay coil C3. The other side of coil C3 is connected by conductor 62, resistor R2, diode D1 and conductor 56 to power source SC2. However, since relay switch S9 which is operated by the coil of relay C1 at this time is open, coil C3 is not yet energized. As will be understood from the following description, relay coil C2 controls the period of braking power application.

Coil C2 when energized also simultaneously closes relay switches S6 and S7. However, since switches S4 and S5 are open, as well as switches S8, S12 and S13 which are relay switches associated with relay coil C3, no DC power is yet available for braking the motor 24. The power to the stator 22 is applied from source SC1 as described above so that at this point the motor 24 is operating to rotate the anode 12 and an X-ray exposure is made.

Upon completion of an exposure and release of the push button PB, starting signal power is removed from source SC1 by way of the connections to the motor control 26, allowing relay coil C1 to drop out after a short delay controlled by its shunt capacitor CP1. This delay insures that external motor control relay action occurs prior to complete de-energization of coil C1 and consequent operation of relay switches S4–S5–S9 and S10. This has been found to considerably improve the protective aspects of the circuit operation, resulting in fewer occasions of damage to components caused by undersirable relay contact arcing, etc.

Deenergization of relay coil C1 results in the closing of relay switches S4, S5 and S9 and in the opening of switch S10. This removes power from relay coil C2 and applies power to relay coil C3. The contacts of relay coil C3, that is, relay switches S8–S1–S12–S2–S13 and S3, all functions now to transfer the X-ray tube stator 22 from the motor control 26 to the half-wave DC power of the braking unit. This is accomplished by relay coil C3 which when thus energized closes relay switches S8, S12 and S13 and opens relay switches S1, S2 and S3. However, power is now supplied to the stator 22 from source SC2 through conductor 54, relay switch S13 and conductor 52, through conductors 54 and 64, relay switch S12 and conductor 50, and through conductor 56, diode D1, resistor R1, relay switches S4, S5, S6, S7 and S8 and conductor 48. Braking power is thus applied to the motor 24 until the time delay of relay coil C2 expires, this being about 3–10 seconds, for example, at which time relay coil C2 becomes completely de-energized and functions to again open relay switches S6 and S7, removing braking power from the motor 24.

De-energization of relay coil C2 also simultaneously opens relay switch S11 which thus disconnects relay coil C3 from the source of power SC2. Coil C3 becomes completely de-energized a short time later, after switch S11 opens due to the delay time afforded by its shunt capacitor CP3. This assures that relay switches S8, S12 and S13 do not open before power is removed from the stator 22, thus preventing damaging contact arcing.

It is important to note that the shunt formed by the connection 64 between relay contacts S12 and S13 must be maintained to absorb power produced by the stator inductance with changing flux resulting from removal of DC braking power so as to reduce relay contact arcing and shorting in recycling operations.

As mentioned above, de-energization of relay coil C2 opens relay switch S11 and removes power from relay coil C3. This returns control of the stator circuit to the motor control unit 26. The brake is now totally de-energized and in a standby condition ready for the next starting cycle.

The actual braking time period can be controlled by proper selection of the shunt capacitor CP2 and relay coil resistance, as desired. It has been found that satisfactory braking will be achieved by use of approximately a 300 mfd. capacitor CP2 which will brake the motor for about 3 to 10 seconds. However, the braking period may be for any determined period of time.

The half-wave rectified system described above has all of the hereinbefore mentioned and other advantages over known braking systems and has built-in protective features as set forth. It is to be understood that this braking system may be used to slow rotation of motor-driven elements other than an X-ray tube, in which case the circuit shown in FIG. 1 will be utilized without the motor control unit.

It is to be further understood that various modifications and changes may be employed by those skilled in the art without departing from the spirit of the invention as expressed in the accompanying claims.

I claim:

1. The combination, with an X-ray tube having a rotatable anode, an electric motor for driving said anode, and an electrical system connecting said motor with a source of alternating current for driving said anode at high speed, said system comprising first circuit means for connecting the alternating current source to the motor for driving the same to affect rotation of the anode; and braking means for slowing rotation of said anode connected into said electrical system between the motor and said source of alternating current, said system comprising a first and second source of alternating current, said braking means comprising a source of half-wave rectified power, and second circuit means for disconnecting said motor from said source of alternating current before complete de-energization to reduce contact arcing and applying half-wave rectified power from said source thereof to the motor for a predetermined time interval sufficient to slow rotation of the anode to the desired extent, and for thereafter removing the flow of half-wave rectified power from the motor to automatically return the control of said motor to said first circuit means, thereby placing said braking means in a standby condition ready for the next starting cycle.

2. The combination, with an X-ray tube having a rotatable anode, an electric motor for driving said anode, and an electrical system for energizing said motor to drive said anode at high speed and for thereafter slowing the rotation of said anode, said system comprising a first and a second source of alternating current, first circuit means for connecting said first source to the motor for driving same to effect rotation of the anode, and braking means for slowing rotation of the anode comprising means for converting current from said second source to half-wave rectified power, and second circuit means for disconnecting said motor from said first source before complete deenergization to reduce contact arcing and applying said half-wave rectified power to the motor for a predetermined time interval, and for thereafter removing the flow of half-wave rectified power from the motor to automatically return the control of said motor to said first circuit means thereby placing said braking means in a standby condition ready for the next starting cycle.

3. A system as set forth in claim 2 wherein said first circuit means includes first current conducting means connecting the motor to said first source and including first relay switches, and said second circuit means includes second current conducting means connecting the motor to said current converting means and including second relay switches, and means for controlling the application of half-wave rectified braking power to the motor comprising time delay relay means operably connected to said second relay switches for closing same upon opening of said first relay switches, and for opening said second relay switches upon completion of a predetermined time interval to remove braking power from the motor.

4. A system as set forth in claim 3 wherein said time delay means have protective shunt capacitors thereacross to delay the effect of de-energization of the relay means.

5. A dynamic braking system for use in conjunction with an X-ray tube having a rotatable anode, an electric motor for driving said anode, and an electrical system for energizing said motor to drive said anode at high speed and for thereafter slowing the rotation of said anode, said system comprising:
 a first source of alternating current;
 a second source of alternating current;
 first circuit means including first current conducting means connecting said first source to the motor for driving same to effect rotation of the anode and including first relay switches;
 braking means for slowing rotation of the anode, said braking means comprising:
  means for converting current from said second source to half-wave rectified power; and
  second circuit means including second current conducting means connecting the motor to said current converting means and including second relay switches, said second circuit means being operative to disconnect said motor from said first source before complete deenergization to reduce contact arcing and to apply said half-wave rectified power to the motor for a predetermined time interval; and
 means for controlling the application of half-wave rectified braking power to the motor comprising electrical time delay relay means operably connected to said second relay switches for closing same upon opening of said first relay switches and for opening said second relay switches upon completion of a predetermined time interval to remove braking power from the motor to automatically return the control of said motor to said first circuit means thereby placing said braking means in a standby condition ready for the next starting cycle.

6. A system as set forth in claim 5 wherein:
 said first circuit means includes a motor control circuit having a first relay coil associated therewith, said coil serving to prevent application of said second source to said motor when no braking is desired; and
 said time delay relay means include second and third relay coils each having a shunt capacitor thereacross, said coils operating in such manner as to apply and remove braking power to and from the motor.

7. A dynamic braking system for use in conjunction with an X-ray tube having a rotatable anode, an electric motor for driving said anode, and an electrical system for energizing said motor to drive said anode at high speed and for thereafter slowing the rotation of said anode, said system comprising:
 a first source of alternating current;
 a second source of alternating current;
 first circuit means including a motor control circuit and current conducting means connecting said first source to the motor for driving same to effect rotation of the anode and including first relay switches, said motor control circuit having a first relay coil associated therewith, said coil serving to prevent application of said second source to said motor during normal rotation of said anode;
 braking means for slowing rotation of the anode, said braking means comprising:
  means for converting current from said second source to half-wave rectified power; and
  second circuit means including second current conducting means connecting the motor to said current converting means and including second relay switches, said second circuit means being operative to disconnect said motor from said first source before complete deenergization to reduce contact arcing and to apply said half-wave rectified power to the motor for a predetermined time interval; and means for controlling the application of half-wave rectified braking power to the motor comprising electrical time delay means including second and third relay coils each having a shunt capacitor thereacross, said second relay coil being operably connected to said second relay switches such that while said second relay coil is energized, half-wave rectified power from said second source is not applied to said motor but when starting signal power is removed from said first source, said first relay coil becomes deenergized thereby removing power from said second relay coil and applying power to said third relay coil, said third coil upon being energized causing opening of said first relay switches and closing of said second relay switches so as to apply half-wave rectified braking power to the motor until the time delay of said second relay coil expires causing certain of said second relay switches to open thereby removing braking power from the motor, complete deenergization of said second relay coil causing deenergization of said third coil which causes opening of the remainder of said second relay switches upon completion of a predetermined time delay to automatically return the control of said motor to said first circuit means thereby placing said braking means in a standby condition ready for the next starting cycle.

References Cited
UNITED STATES PATENTS

| | | | |
|---|---|---|---|
| 1,911,356 | 5/1933 | Eames | 318—212 |
| 2,445,430 | 7/1948 | Herchenroeder | 318—212 |
| 2,445,806 | 7/1948 | Snyder | 318—212 |
| 2,512,354 | 6/1950 | Marbury | 318—212 |
| 2,637,007 | 4/1953 | Ricking et al. | 318—212 |
| 2,818,539 | 12/1957 | Johnson | 318—212 XR |
| 2,929,977 | 3/1960 | Choudhury | 318—212 |
| 3,233,158 | 2/1966 | Gilbert | 318—212 |
| 3,281,632 | 10/1966 | Ozaki | 318—212 XR |

ORIS L. RADER, Primary Examiner

G. Z. RUBINSON, Assistant Examiner